United States Patent [19]

Nakagomi

[11] Patent Number: 4,884,091
[45] Date of Patent: Nov. 28, 1989

[54] EXPOSURE CONTROL DEVICE IN A CAMERA

[75] Inventor: Kazuhito Nakagomi, Kofu, Japan

[73] Assignee: Nippon Seimitsu Kogyo Kabushiki Kaisha, Kofu, Japan

[21] Appl. No.: 221,288

[22] Filed: Jul. 19, 1988

[30] Foreign Application Priority Data

| Oct. 8, 1987 | [JP] | Japan | 62-154453[U] |
| Nov. 4, 1987 | [JP] | Japan | 62-168845[U] |
| Nov. 10, 1987 | [JP] | Japan | 62-171468[U] |
| Nov. 10, 1987 | [JP] | Japan | 62-171471[U] |
| Nov. 10, 1987 | [JP] | Japan | 62-171472[U] |
| Nov. 10, 1987 | [JP] | Japan | 62-171473[U] |
| Nov. 10, 1987 | [JP] | Japan | 62-171474[U] |
| Nov. 19, 1987 | [JP] | Japan | 62-177034[U] |
| Nov. 19, 1987 | [JP] | Japan | 62-177035[U] |
| Nov. 30, 1987 | [JP] | Japan | 62-183824[U] |

[51] Int. Cl.$^4$ .............................................. G03B 9/02
[52] U.S. Cl. .................................... 354/271.1; 354/270
[58] Field of Search ............... 354/230, 246, 247, 270, 354/271.1, 274, 435, 436, 437, 438, 439, 440

[56] References Cited

U.S. PATENT DOCUMENTS

| 3,873,987 | 3/1975 | Brauning et al. | 354/230 |
| 3,928,859 | 12/1975 | Peterson | 354/436 |
| 3,938,168 | 2/1976 | Lange | 354/247 |
| 4,149,974 | 4/1979 | Takahama et al. | 354/437 |
| 4,797,700 | 1/1989 | Tsuji et al. | 354/270 |

FOREIGN PATENT DOCUMENTS

| 59-4524 | 1/1984 | Japan . |
| 62-6711 | 1/1987 | Japan . |
| 62-9235 | 1/1987 | Japan . |
| 62-84031 | 5/1987 | Japan . |
| 62-91625 | 6/1987 | Japan . |

*Primary Examiner*—A. A. Mathews
*Attorney, Agent, or Firm*—Oblon, Spivak, McClelland, Maier & Neustadt

[57] ABSTRACT

A pair of iris diaphragms are each connected to a driving pin formed on either free end of a rocking lever at one point and are each supported slidably by a single guide pin formed on a base plate, thereby to move smoothly without wobbling. By driving the rocking lever with a motor, the iris diaphragms move in opposite directions to form an iris aperture for determining correct exposure in fast response to the brightness of a subject to be taken as an image.

15 Claims, 7 Drawing Sheets

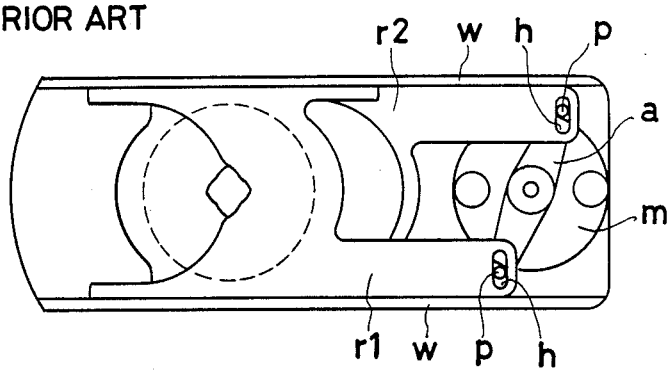
FIG_1(A) PRIOR ART
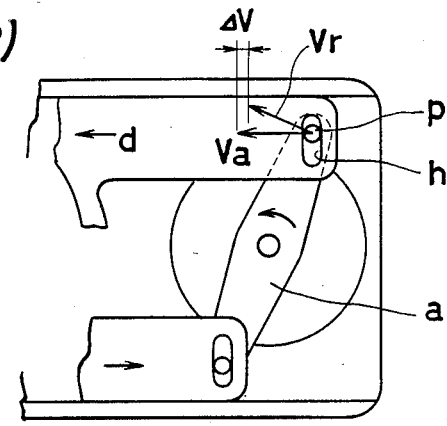
FIG_1(B) PRIOR ART
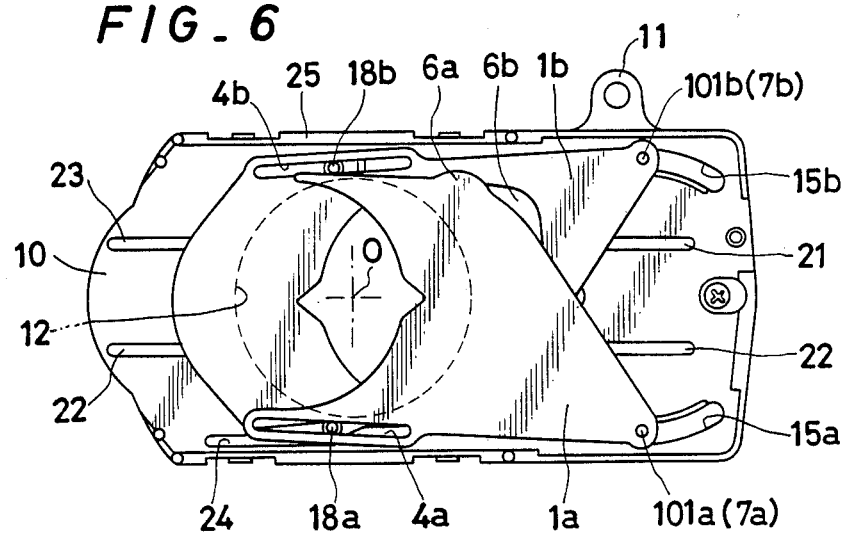
FIG_6

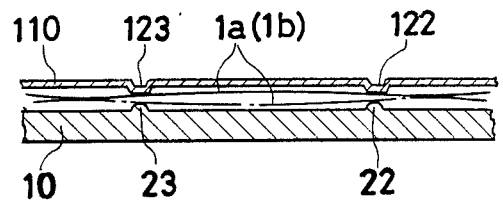
FIG_9 (A)
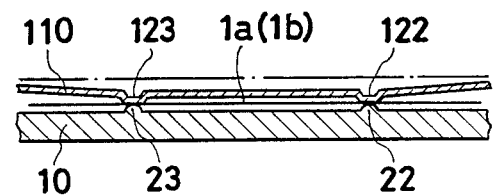
FIG_9 (B)
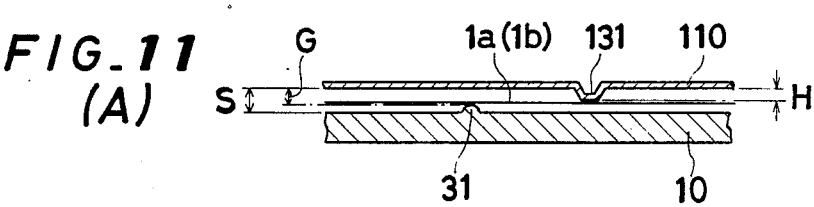
FIG_11 (A)
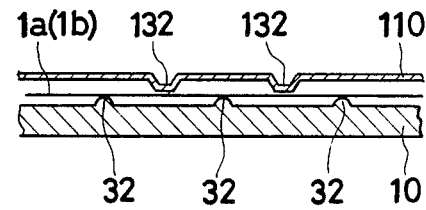
FIG_11 (B)
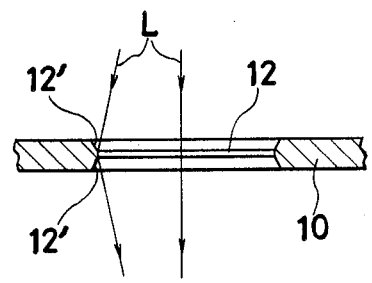
FIG_12 (A)
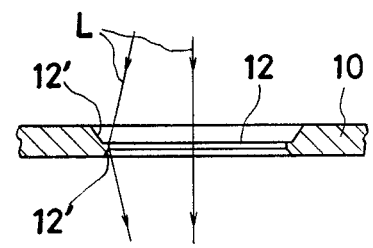
FIG_12 (B)

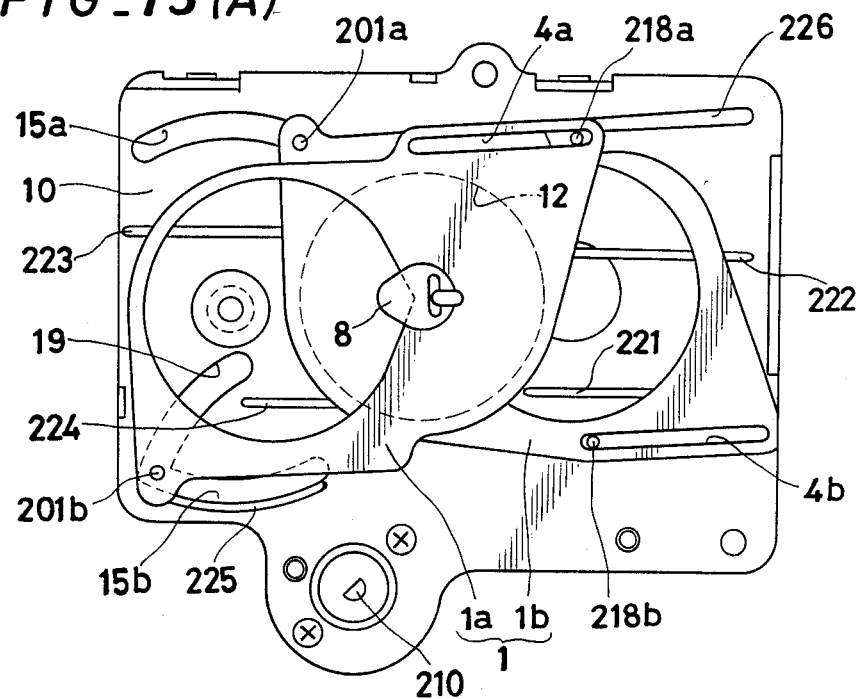
FIG_13(A)
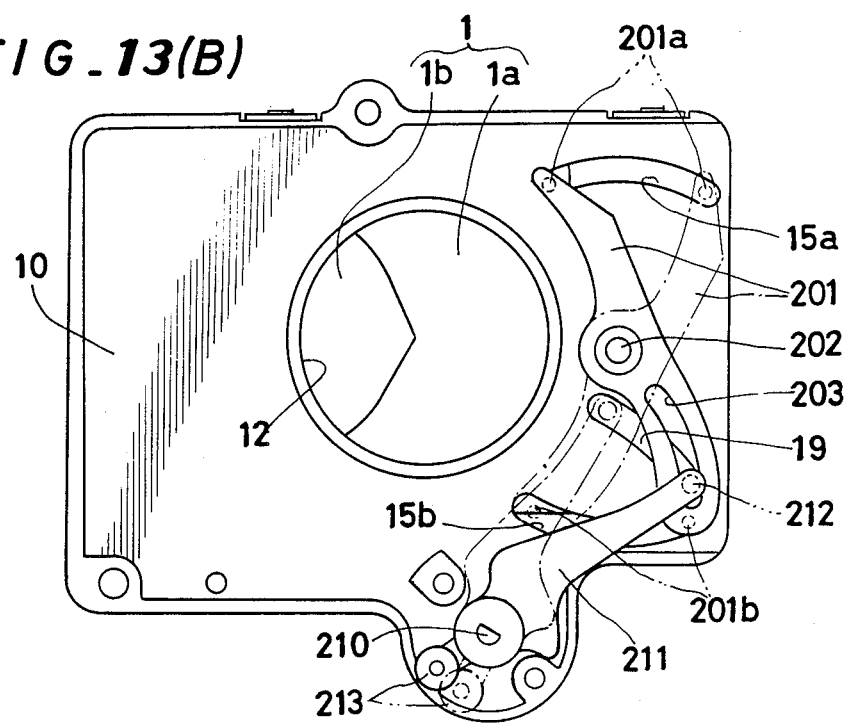
FIG_13(B)

EXPOSURE CONTROL DEVICE IN A CAMERA

BACKGROUND OF THE INVENTION

1. Field of the Invention

This invention relates to an exposure control device for use in a camera. More particularly, the invention concerns improvements in an exposure control device for opening and closing iris diaphragms in automatic cameras such as a video camera, which has an automatic exposing function capable of automatically determining the correct exposure.

2. Description of the Prior Art

Among automatic cameras such as video cameras, there are cameras equipped with an automatic exposure controlling means for automatically selecting and setting the iris aperture (exposure) formed by a plurality of iris diaphragms in accordance with the brightness of a subject to be taken as an image. There have heretofore been proposed some which have an exposure controlling mechanism being simple in construction to meet requirements for a small and easily portable automatic video camera capable of stably setting the iris aperture.

As proposed by Japanese Utility Model Application Public Disclosure Nos. SHO 59-4524(A); SHO 62-6711(A); SHO 62-9235(A); SHO 62-84031(A); and SHO 62-91625(A), conventional cameras are provided with a pair of iris diaphragms which move slidably in opposite directions so as to adjust the iris aperture defined by exposure spaces formed in the respective iris diaphragms. Each of the iris diaphragms used in the conventional cameras has two parallel slots in its side portions and is movably supported by guide pins which are planted on a base plate, as proposed in Japanese U.M. Appln. Pub. Discl. No. SHO 59-4524(A). The iris diaphragms are driven to move parallel in opposite directions with rocking motion of a diaphragm driving lever attached to a motor, so that the iris aperture can be adjusted.

In the other prior art cameras (for example, Japanese U.M. Appln. Pub. Discl. No. SHO 62-84031(A)), as illustrated in FIG. 1(A), a pair of iris diaphragms r1, r2 each having a guide hole h are engaged with the respective driving pins p planted on either end portion of a diaphragm driving arm a which is rockingly moved by a motor m. By operating the motor m to move parallel the iris diaphragms r1, r2 in opposite directions, the iris aperture is adjusted to change the intensity of the light passing through the iris aperture for exposure in accordance with the brightness of a subject to be taken as an image. The iris diaphragms r1, r2 are slidably supported between side guide walls w formed on a base plate in a state being in line contact with the side guide walls w, so that the diaphragms can move parallel.

The iris diaphragm is generally made of a thin plate of metal plate or synthetic resin of about 50 $\mu$m to 150 $\mu$m thickness and can be expected to move smoothly and permit fast response. To efficiently move such thin iris diaphragms with slight torque, driving loss should be reduced to the fullest possible extent. However, two iris diaphragms r1, r2 in the prior art exposing mechanism are in frictional contact with the opposite side guide walls w (as shown in Japanese U.M. Appln. Pub. Discl. No. SHO 62-84031(A), for example) or guide pins which are engaged slidably with guide slots formed in the iris diaphragms (as in Japanese U.M. Appln. Pub. Discl. No. SHO 59-4542(A)), with the result that frictional resistance produced between the diaphragms and the guide means such as the guide walls or guide slots is increased. A low power driving motor incorporated within a compact camera is adversely affected by the frictional resistance. Though the frictional resistance between the iris diaphragms and the guide means can be reduced by providing sufficient clearance therebetween, wobbling of the iris diaphragms is however caused due to the clearance, thereby involving a decrease in exposure accuracy.

Besides, there is a case where the kinetic efficiency of the iris diaphragms is decreased when two pairs of the guide means for slidably supporting the iris diaphragms are not precisely positioned. Thus, the iris diaphragms are generally set with sufficient clearance in relation to the guide means in consideration of an error of position of the guide means, thereby to involve wobbling the iris diaphragms and decrease the stability of motion of the iris diaphragms as a matter of course.

On the other hand, the prior art exposure control device as proposed by Japanese U.M. Appln. Pub. Discl. No. SHO 62-84031(A) has iris diaphragms r1, r2 which move in one direction (direction d) substantially orthogonal to the lengthwise direction of an iris driving arm a as shown in FIG. 1(B). In this device, however, when the iris driving arm a assumes its extreme angular position as illustrated, there is produced a difference $\Delta V$ in motion vector between the motion vector Va of the arm a and the motion vector Vr in the direction in which the iris diaphragms r1, r2 are allowed to move. The difference $\Delta V$ in motion vector comes to a kinetic loss. The same is true of Japanese U.M. Appln. Pub. Discl. No. SHO 59-4524(A).

Furthermore, another camera shutter disclosed in U.S. Pat. No. 3,938,168 has a pair of iris diaphragms which are slidably supported by guide grooves formed in the side edge portions of a casing. This shutter mechanism has entailed a disadvantage that frictional resistance produced between the iris diaphragms and the guide grooves is increased when the iris diaphragms are firmly supported in order to be prevent wobbling, and otherwise, the iris diaphragms would move unstably with wobbling when they are loosely supported.

OBJECT AND SUMMARY OF THE INVENTION

The present invention aims to eliminate the aforementioned drawbacks of conventional exposure control devices. One object of the present invention is to provide an exposure control device for use in an automatically exposing camera, which permits fast response to changes of brightness of a subject to be taken as an image and stable and smooth movements of iris diaphragms by effectively reducing a load to an iris driving means and frictional resistance produced between the iris diaphragms and guide means for slidably supporting the diaphragms.

Another object of the present invention is to provide an exposure control device capable of driving the iris diaphragms in opposite directions without interfering with each other so as to permit the iris diaphragms to move smoothly and securely.

Still another object of the present invention is to provide an exposure control device which is simple in construction and easy to assemble and enables an iris aperture to easily coincide with a lens barrel in an optical axis in incorporating the iris diaphragms into a camera with accuracy.

To attain the above objects according to the present invention, there is provided an exposure control device which comprises an iris composed of a pair of iris diaphragms which define an iris aperture, each of the iris diaphragms being provided with a single guide slot; a driving motor for slidably moving the iris diaphragms in opposite directions; and a base plate having about its optical axis an exposure opening defining the exposing aperture and adapted to slidably support the iris diaphragms and fix the driving motor thereon, which base plate has guide pins which are inserted into the guide slots formed in the iris diaphragms so as to permit the iris diaphragms to slidably move in substantially opposite directions. A guard cover is attached to the base plate so as to cover the iris diaphragms in conjunction with the base plate. The base plate and guard cover are provided on their opposite surfaces with guide ribs for permitting the iris diaphragms to move smoothly.

Since each of the iris diaphragms is connected to the rocking lever at one point and slidably supported at one point by one guide pin planted on the base plate, frictional resistance produced in moving the iris diaphragms becomes small and the iris diaphragms move smoothly without wobbling to open and close the iris aperture stably.

Moreover, contact resistance produced between the iris diaphragms in motion and the base plate and guard cover can be reduced owing to the guide ribs formed on the base plate and the guard cover.

The features of the present invention which are believed to be novel are set forth with particularity in the appended claims. The present invention, both as to its organization and manner or operation, together with further objects and advantages thereof, may best be understood by reference to the following description, taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1(A) is a plan view schematically showing one conventional exposure control device.

FIG. 1(B) is a schematic diagram showing another conventional exposure control device.

FIG. 6 is an explanatory diagram showing the iris diaphragms in an assembled state into the base plate.

FIGS. 9(A) and 9(B) are partially sectional views of the condition in which the iris diaphragms are supported between guide ribs formed on the base plate and the guard cover.

FIGS. 11(A) and 11(B) are partially sectional views of the condition in which the iris diaphragms are supported between guide ribs formed on a base plate and a guard cover in still another embodiment.

FIGS. 12(A) and 12(B) are partially sectional views showing yet another embodiment of the invention.

FIGS. 13(A) and 13(B) are a plan view and a bottom view showing a further embodiment of the invention.

DESCRIPTION OF THE PREFERRED EMBODIMENTS

Figure 2:
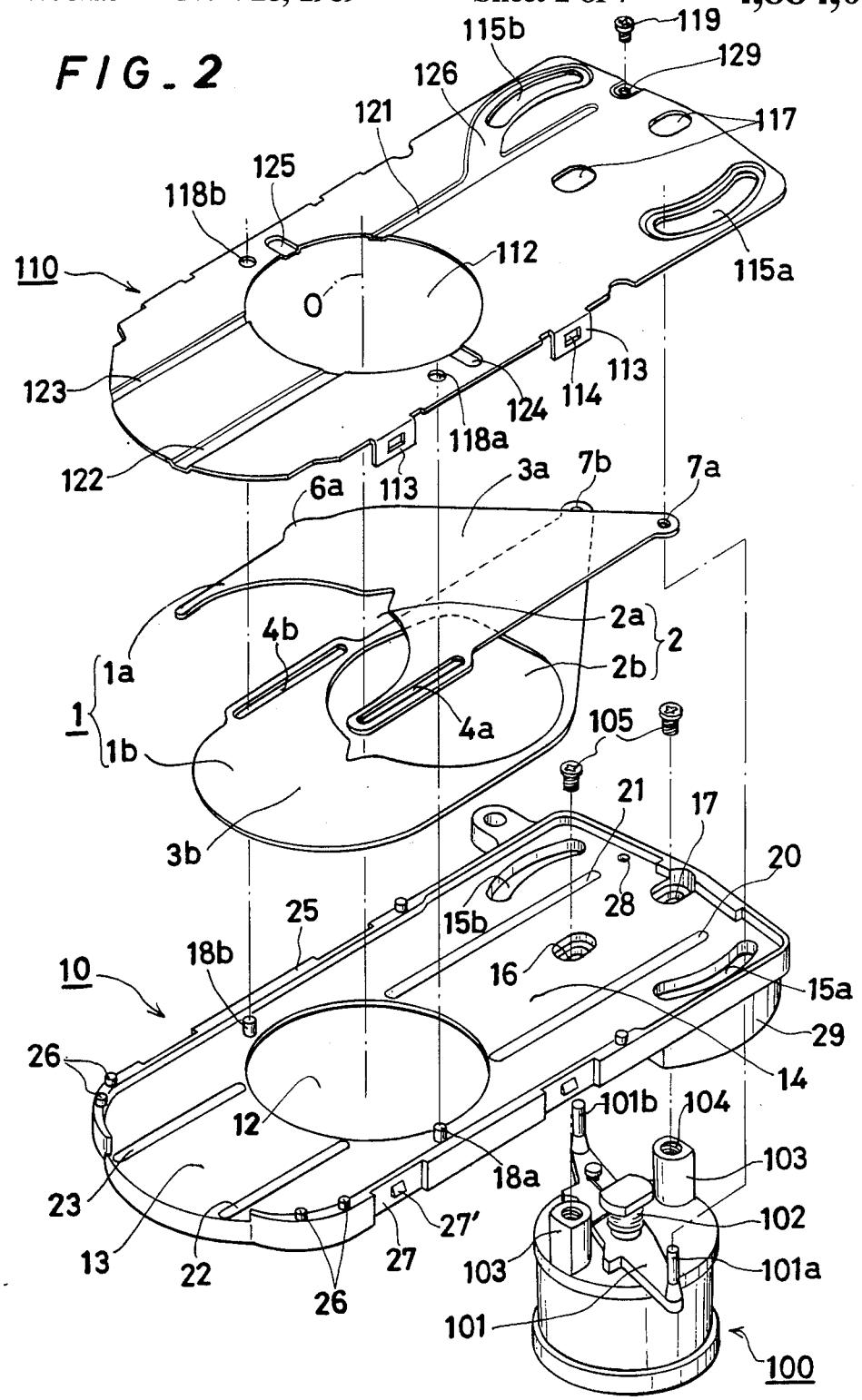
FIG. 2 is an exploded perspective view showing one embodiment of the exposure control device according to this invention.
Figure 3A:
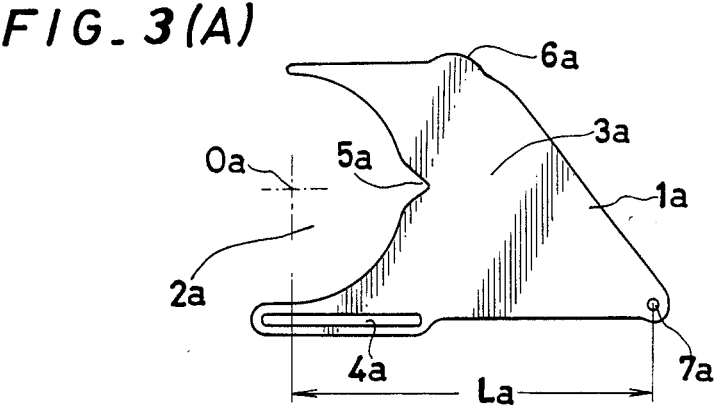
FIGS. 3(A) and 3(B) are plan views showing a pair of iris diaphragms of this invention.
Figure 3B:
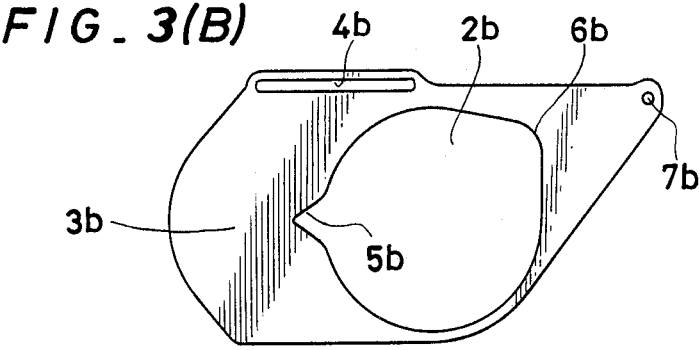
Figure 5:
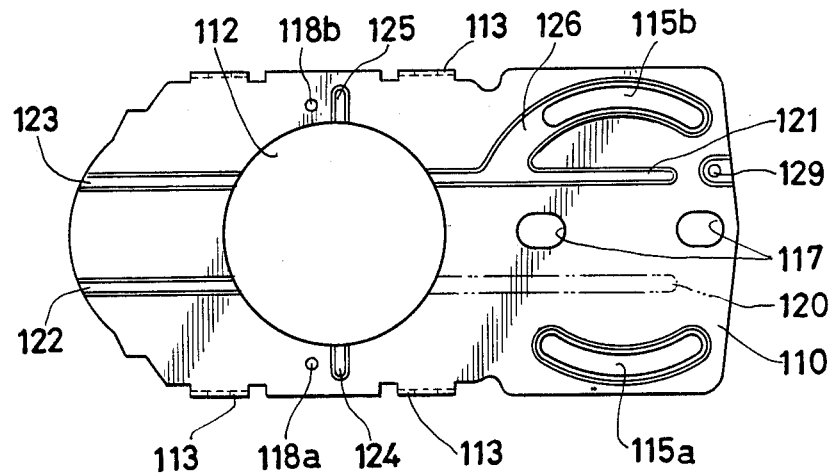
FIG. 5 is a plan view of a guard cover of this invention.

One preferred embodiment of the exposure control device according to the present invention will be hereinafter described with reference to FIGS. 2 to 8.

The exposure control device of the invention comprises an iris 1 composed of a pair of iris diaphragms 1a, 1b, a base plate 10 for slidably supporting the iris diaphragms 1a, 1b, a driving motor 100 fixed on the lower surface of the base plate 10, and a guard cover 110 attached to the base plate 10 so as to accommodate the iris 1 in conjunction with the base plate 10.

The iris diaphragms 1a, 1b are movable in opposite directions on the upper surface of the base plate 10 and have respective exposure spaces 2a, 2b which form an iris aperture by mutual motions thereof. That is to say, the iris aperture defined by the exposure spaces 2a, 2b varies in size with the iris diaphragms 1a, 1b moving slidably in opposite directions so as to obtain the optimum exposure in accordance with the brightness of a subject to be taken as an image. That is to say, the larger the iris diaphragms 1a, 1b are overlapped, the smaller the iris aperture is. When the iris diaphragms 1a, 1b are overlapped completely, no aperture is formed, and when they are overlapped in the least area, the iris aperture becomes largest. Thus, one of the iris diaphragms, 1a, has a closer portion 3a on the right side of the exposure space 2a in FIG. 3(A), and the other iris diaphragm 1b has a closer portion 3b on the left side of the exposure space 2b in FIG. 3(B). From this it can be understood that the iris aperture can be adjusted in size to the utmost limit by moving the respective iris diaphragms in opposite directions by at most the distance half the maximum diameter of the iris aperture. To allow the iris diaphragms 1a, 1b to move in opposite directions, guide slots 4a, 4b are formed in the respective iris diaphragms 1a, 1b so as to receive guide pins 18a, 18b planted on the base plate 10, as will be described later in detail.

The exposure spaces 2a, 2b of the iris diaphragms 1a, 1b have acute notches 5a, 5b so as not to shape the least iris aperture formed by the iris diaphragms into a slender form. Therefore, each of the aforesaid guide slots 4a, 4b formed in the iris diaphragms has a length more than the sum of the effective radius of the full iris aperture and the depth of the acute notch 5a or 5b.

The exposure space 2a of the iris diaphragm 1a is shaped in a substantial semi-circle, and the exposure space 2b of the iris diaphragm 1b is shaped in a substantial circle. The iris diaphragm 1b has an anti-interference dent portion 6b which is formed on the opposite side to the closer portion 3b by partially enlarging the exposure space 2b. On the other hand, the iris diaphragm 1a has an anti-interference expansion portion 6a formed by expanding partially the circumferential portion defining the exposure space 2a. These dent and expansion portions 6a, 6b constitute an anti-interference means for preventing the iris diaphragms 1a, 1b from being caught by each other when the iris diaphragms is moving to open or close the iris aperture.

In the drawing, reference numerals 7a and 7b denote pin holes formed in the iris diaphragms 1a, 1b. The distance La from the center Oa of the exposure space 2a of the iris diaphragm 1a to the pin hole 7a in the direction of movement of the iris diaphragm 1a (horizontal direction in FIG. 3(A)) is more than the sum of 1.5 times the maximum diameter of the iris aperture and the depth of the acute notch 5a.

The base plate 10 is attached directly to, for instance, a lens barrel of a camera into which the exposure control device of the invention is incorporated. Fixing of the base plate 10 to the lens barrel is attained by use of a screw to be screwed in a fitting portion 11. The base plate 10 has an exposure opening 12 defining the iris aperture with an axis O coinciding with the optical axis of a lens system in the camera. The circumferential edge portion defining the exposure opening 12 of the base plate 10 is formed with a circular step 12' to be thinned as illustrated in FIG. 4(B), so that harmful reflection on the circumferential edge can be somewhat decreased.

Figure 4A:
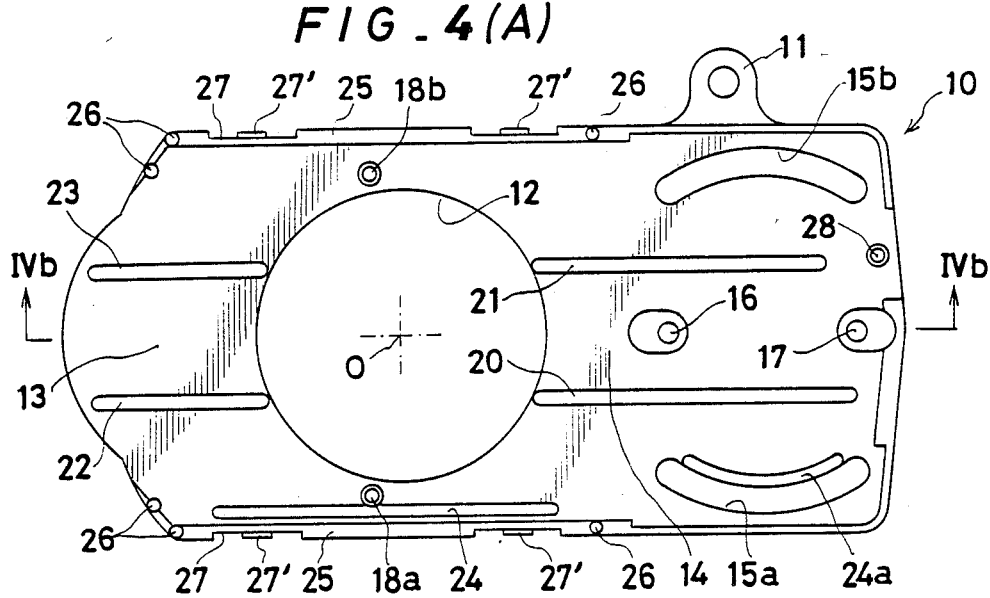
FIGS. 4(A) through 4(C) are a plan view, a cross section taken along the line IV–IV in FIG. 4(A), and a bottom view of a base plate of this invention.
Figure 4B:
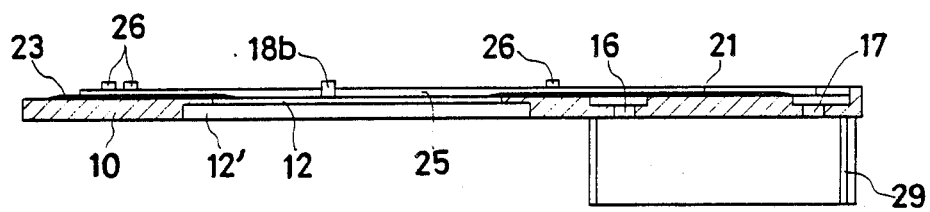
Figure 4C:
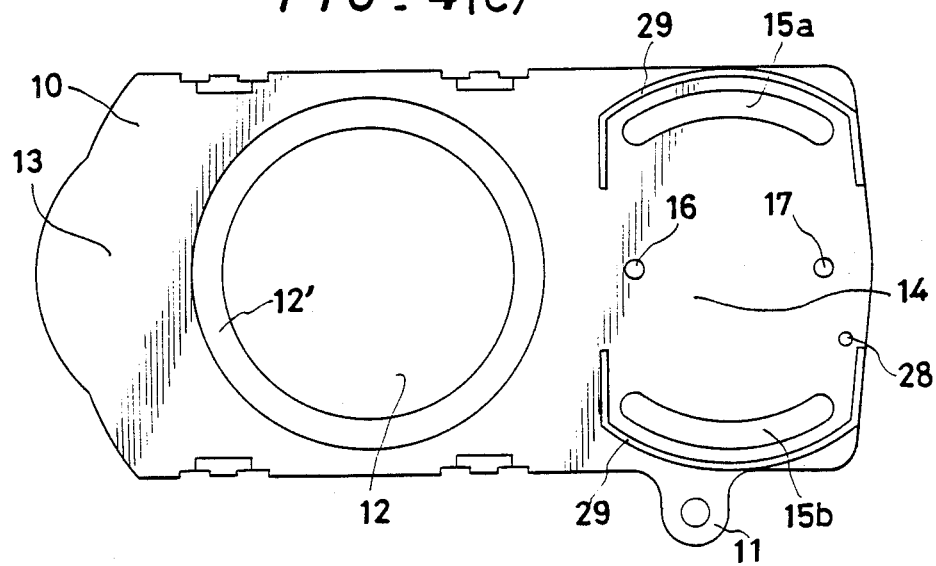

The base plate 10 has a broad portion 13 on one side (left side in FIG. 4(A)) of the exposure opening 12, which is similar in shape to the closer portion 3b of the iris diaphragm 1b, and another broad portion 14 on the other side (right side in the same drawing) of the exposure opening 12, which has a width larger than about two times the diameter of the maximum iris aperture. In this embodiment, on the lower side of the broad portion 14, there is mounted a driving motor 100. The distance between the rotary shaft Ma of the motor 100 and the center O of the exposure opening 12 is substantially equal to the aforementioned distance La defined on the iris diaphragm 1a (FIG. 3(A)). In the base plate 10, there are formed arcuate holes 15a, 15b about the rotary shaft Ma of the motor 100. The distance (standard radius) from the rotary shaft Ma to the respective arcuate holes 15a, 15b is made slightly larger than half the width (transverse length) of the iris means 1. The motor 100 is fixed onto the base plate 1 by use of screws to be fitted in fitting holes 16, 17 bored in the base plate.

The base plate 10 has guide pins 18a, 18b planted one on either transverse side of the exposure opening 12, which pierce through the guide slots 4a, 4b formed in the iris diaphragms 1a, 1b. The distance between the guide pins 18a, 18b is somewhat larger than the transverse width of the iris diaphragms 1a, 1b and the diameter of the guide pins 18a, 18b is substantially equal to the width of the guide slots 4a, 4b of the iris diaphragms.

On the base plate 10, there are formed a plurality of guide ribs 20, 21, 22 and 23. Though the number of guide ribs are not limited in this invention, it is preferable for the base plate to have the guide ribs as little as possible. Those guide ribs are arranged symmetrically with respect to the center line connecting the rotary axis Ma of the motor 100 and the center O of the exposure opening 12. The guide ribs 20-23 are adapted to minimize the contact area of the iris diaphragm 1b and the base plate 10.

In the vicinity of the guide pin 18a for guiding the upper iris diaphragm 1a, there is formed an auxiliary guide rib 24 which comes into contact with only the upper iris diaphragm 1a so that the iris diaphragms 1a, 1b can stably move in opposite directions. Namely, the auxiliary guide rib 24 is made higher than the other ribs 20 to 23 by the thickness of the iris diaphragm 1b. To get the same effect, another auxiliary guide rib 24a may be formed along the arcuate hole 15a.

Figure 7:
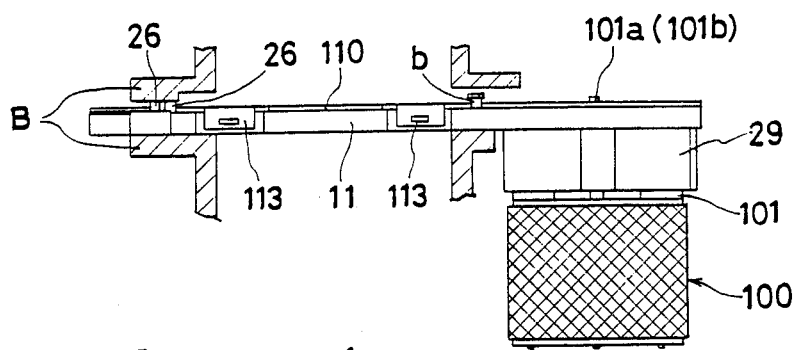
FIGS. 7 and 8 are a side view and a plan view both showing the exposure control device in an assembled state in a lens barrel of a camera.
Figure 8:
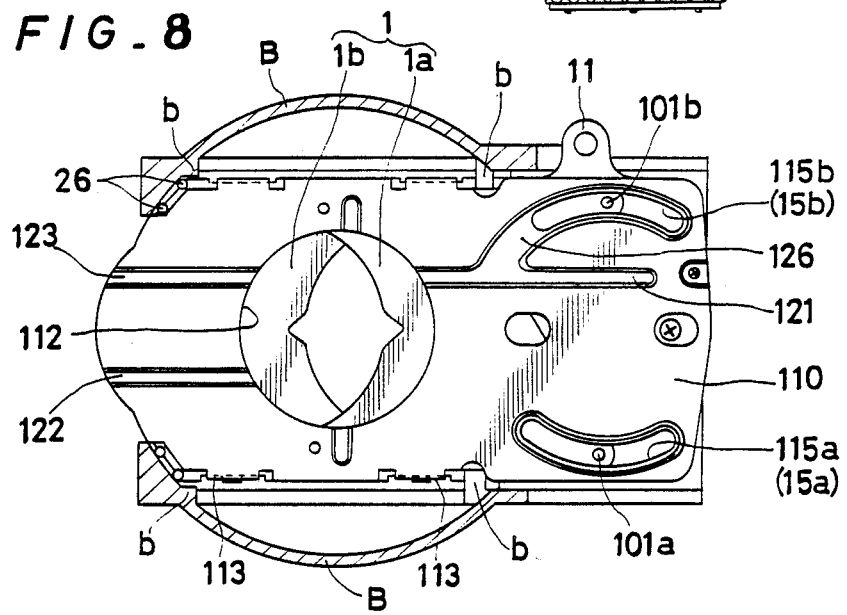

A surrounding wall 25 is intermittently formed along the circumferential edge portion of the base plate 10. On the surrounding wall 25, there are formed positioning projections 26 for facilitating the incorporate of the exposure control device of the invention into the lens barrel B with accuracy in position (FIGS. 7 and 8). Namely, the positioning projections 26 are placed at the positions opposite to positioning members b formed on the lens barrel B.

To fix the guard cover 110 onto the base plate 10, notches 27 with claws 27' are formed in the side portions of the base plate 10. The guard cover 110 is retained by a screw 119 which is fitted into a fitting hole 28 in the base plate 10 through a hole 129 bored in the cover 110. The base plate 10 is provided on its lower side with protection walls 29 surrounding the arcuate holes 15a, 15b. Though this base plate 10 may easily be made of synthetic resin by injection molding, this invention places no restriction on the material of the base plate.

The driving motor 100 mounted on the lower side of the base plate 10 has an electromagnetically driven system including an electromagnetic coil and an electromagnet as seen in an ammeter. By applying an electric current corresponding to the brightness of the subject to be taken as an image, the rotary shaft of the motor 100 is rotated by a desired angle corresponding to the electric current applied thereto.

Onto the rotary shaft of the driving motor 100, there is fixed a rocking lever 101 having driving pins 101a, 101b disposed one on either end of the rocking lever 101. The distance between the driving pins 101a, 101b is substantially equal to the standard diameter of the arcuate holes 15a, 15b formed in the base plate 10. The rocking lever 101 is forced in one direction by a coil spring 102 held by the rotary shaft of the driving motor 100. Thus, the rocking lever 101 is positioned at its rest position when the driving current to be supplied to the motor 100 is off.

The driving motor 100 has opposite stanchions 103 with fitting holes 104 into which screws 105 are set through the fitting holes 16, 17 formed in the base plate, thereby to fix the motor 100 to the base plate 10. Owing to the stanchions 103 formed on the motor 100 and the protection walls 29 extending downwardly from the base plate 10, the rocking lever 101 can be reliably driven to rotate.

The iris diaphragms 1a, 1b is assembled in the united base plate 10 and motor 100 as illustrated in FIG. 6. In such an assembled state of the iris diaphragms 1a, 1b, the driving pins 101a, 101b of the rocking lever 101, which pierce through and project upward from the arcuate holes 15a, 15b of the base plate 10, are fitted into the pin holes 7a, 7b formed in the iris diaphragms 1a, 1b, and the guide pins 18a, 18b planted on the base plate 10 are in the guide slots 4a, 4b of the iris diaphragms 1a, 1b. Thus, each of the iris diaphragms 1a, 1b is connected to the rocking lever 101 at one point, and supported by the guide pin 18a or 18b at one point. The iris diaphragms can therefore move smoothly without loss in motion vector.

In the assembled state of the iris diaphragms as noted above, when the rocking lever 101 is driven to rotate, the driving pins 101a, 101b planted on both end portions of the driving lever 101 move along the arcuate holes 15a, 15b and operate the iris diaphragms 1a, 1b to move in opposite directions so as to vary the iris aperture in size.

The guard cover 110 has the same plan shape as that of the base plate 10 and an exposure opening 112 having the center common to the optical axis O. The base plate 10 is covered with the guard cover 110 in such a state that the iris diaphragms 1a, 1b are interposed therebetween. The guard cover 110 is fixedly retained by an engaging means constituted by engaging pieces 113 each having an engaging hole 114, which extend downward from the cover 110, and the aforesaid claws 27′ formed in the notches 27 of the base plate 10. The guard cover 110 has arcuate holes 115a, 115b for receiving and guiding the driving pins 101a, 101b of the rocking lever 101 and further pin holes 118a, 118b for receiving the guide pins 18a, 18b planted on the base plate 10. Holes 117 bored in the guard cover 110 are adapted to permit a screwdriver to be inserted therethrough in, screwing up the aforesaid screw 105. Through a hole 129 in the guard cover 110, a screw 119 is fitted into the fitting hole 28 formed in the base plate 10 so as to fix the guard cover 110 to the 129 plate 10. These holes 115a, 115b, 117, 118a, 118b and 129 are not necessarily indispensable in the invention.

The guard cover 110 has longitudinal guide ribs 121, 122, and 123, and transverse ribs, 124 and 125 projecting downward from the lower surface thereof, which have the same function as those 20–24 formed on the upper surface of the base plate 10. That is to say, due to the guide ribs 121–125 projecting downward from the guard cover 110, the contact area between the guard cover 110 and the upper iris diaphragm 1a is rather decreased. The guide ribs 121–125 may preferably be positioned opposite to the guide ribs 20–24. Optionally, a guide rib 120 as indicated by the chain line in FIG. 5 may be formed at the position opposite to the guide rib 20 formed on the base plate 10. At positions on the guard cover 110 where the guide slots 4a, 4b formed in the iris diaphragms 1a, 1b in motion pass, there are formed transverse guide ribs 124, 125 having a length larger than the width of the guide slots 4a, 4b and connected to the exposure opening 112 formed in the guard cover 110. A further guide rib 126 is formed in an arcuate shape around the arcuate hole 115b. The guide rib 126 is in connection with the longitudinal guide rib 121. The number and position of these guide ribs are not limited in this invention. The guard cover 110 with the guide ribs can easily be manufactured by, for example, sheet metal processing.

To be specific, because the guard cover 110 is attached to the upper surface of the surrounding wall 25 of the base plate 10, the rising height of the surrounding wall 25 is determined to be substantially equal to the sum of the thicknesses of both iris diaphragms 1a, 1b, the height of the guide ribs 20–23 on the base plate 10, and the height of the guide ribs 121–123 projecting downward from the lower surface of the guard cover 110. If the surrounding wall 25 is too high, the iris diaphragms 1a, 1b become wobbly and unstably move in adjusting the iris aperture in size, and if the wall 25 is too low, the iris diaphragms 1a, 1b become hard to move.

Next, the effect of the aforesaid elements constituting the exposure control device having the aforementioned construction will be described.

Though the iris diaphragms 1a, 1b are guided by the guide pins 18a, 18b on the base plate 10, to be exact, they do not move parallel with the circular motion of the driving pins 101a, 101b. That is, the iris diaphragms 1a, 1b move in a circle with a remarkably large radius of gyration about the respective guide pins 18a, 18b and slide in the longitudinal direction of the base plate 10 when the driving motor 100 is driven to rotate the rocking lever 101. This means that the iris diaphragms 1a, 1b in motion are little affected by a vector difference brought about by converting the circular motion of the rocking lever 101 to the gentle circular motion of the iris diaphragms in comparison with a conventional mechanism in which iris diaphragms move parallel. Thus, the frictional resistance produced between the iris diaphragms and the guiding means, and the driving torque for the iris diaphragms can be remarkably reduced according to the invention.

Besides, since each of the iris diaphragms 1a, 1b is supported by the single guide pin 18a or 18b, and therefore, clearance between the guide pins 18a, 18b on the base plate 10 and the guide slots 4a, 4b formed in the iris diaphragms 1a, 1b can be minimized, wobbling of the iris diaphragms in the transverse direction of the base plate 10 can be considerably suppressed. To be more specific, by disposing the corresponding guide ribs 21–23 and 121–123 face to face, the iris diaphragms 1a, 1b are prevented from wobbling and being deflected, as shown schematically in FIG. 9(A). Furthermore, when the guard cover 110 receives external force from the upper side to be bent downward as illustrated in FIG. 9(B), bending of the guard cover is in no way increased due to the guide ribs formed on the base plate.

Since the base plate 10 is provided on its upper surface with the guide ribs 20–23 and the guard cover 110 is provided on its lower surface with the guide ribs 121–125, the frictional resistance of the iris diaphragms 1a, 1b relative to the base plate 10 and the guard cover 110 can be reduced.

By providing the anti-interference projection 6a on the iris diaphragm 1a and the anti-interference dent 6b in the iris diaphragm 1b, the iris diaphragms 1a, 1b do not cause the inner edges of the exposure spaces 2a, 2b to collide with each other, thereby to assure smooth and reliable opening and closing of the iris aperture.

Figure 10:
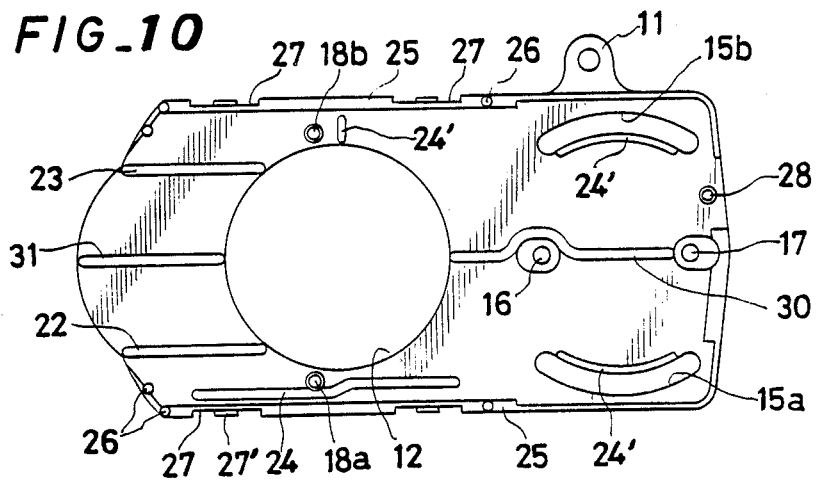
FIG. 10 is a plan view showing a base plate of another embodiment of the invention.

In another embodiment shown in FIG. 10, a central guide rib 30 is formed on the upper surface of the base plate 10 instead of the ribs 20, 21 in the foregoing embodiment, and another guide rib 31 is formed between the ribs 22 and 23. The side guide rib 24 for supporting only the upper iris diaphragm 1a is formed in a nonlinear shape so as to support effectively the iris diaphragm 1a. In this case, the guard cover 110 may be provided with guide ribs opposite to the guide ribs 30, 31 on the base plate 10 to obtain the effects illustrated in FIGS. 9(A) and 9(B). However, as shown by reference numerals 131 and 132 in FIGS. 11(A) and 11(B), the guide ribs formed on the lower surface of the guard cover 110 may be displaced relative to the ribs 31 or 32 formed on the base plate 10. In the case where the guide rib 131 of the guard cover 110 is displaced relative to the guide rib 31 on the base plate 10 as illustrated in FIG. 11(A), this arrangement has an advantage that a gap G between the guard cover 110 and the guide rib 31 on the base plate 10 or a height H of the guide rib 131 of the guard cover 110 can be sufficiently secured even if the distance S between the base plate 10 and the guard cover 110 is small. Moreover, smooth movement of the iris diaphragms 1a, 1b can be expected because the contact resistance of the iris diaphragms relative to the base plate 10 and the guard cover 110 is decreased.

Still another embodiment illustrated in FIGS. 12(A) and 12(B) provides a suitable optical condition of the exposure opening 12 formed in the base plate 10. With this structure, undesirable reflection of light L passing through the exposure opening 12, which occurs on the circumferential edge defining the opening 12 can be weakened so as to pass only a desirable light, i.e. the light from the subject to be taken as an image. That is to say, the opening 12 may be chamfered to form upper and lower slant surfaces 12' as illustrated in FIG. 12(A). Further, the opening 12 may be treated to cut off the slant surface 12' on the incidence side in the shape of a step as illustrated in FIG. 12(B).

In any of the embodiments noted above, the rocking lever 101 for driving the iris diaphragms 1a, 1b is fixed directly on the rotary shaft of the driving motor 100. However, there is a case where the driving motor and the rocking lever must be disposed as separated from each other on account of design. FIGS. 13(A) and 13(B) show a further embodiment in which the rotary shaft 210 of a driving motor does not coincide with the rotation axis 202. In this illustrated embodiment, the elements indicated by like reference numerals with respect to those of the foregoing embodiments have analogous functions to those of the foregoing embodiments and will not be described in detail again. The rocking lever 201 has a rotation axis 202 and driving pins 201a, 201b which pierce through arcuate holes 15a, 15b formed in the base plate 10. The rotational motion produced by the driving motor is transmitted to the rocking lever 201 through a link 211 fixed onto the rotary shaft 210 of the motor. The rocking lever 201 and the link 211 are connected by bringing a pin 212 planted on the free end of the link 211 in engagement with a slot 203 formed in one side of the rocking lever 201. By driving the rocking lever 201 with the motor set in motion, the iris diaphragms 1a, 1b move in opposite directions so as to open or close an iris aperture, similarly to the foregoing embodiments. In this embodiment, the base plate 10 has a guide slot 19 for guiding the pin 212 planted on the link 211. The link 211 has a balance weight 212 on the portion extending backward from the axis part thereof, so as to move stably. Also, similarly to the foregoing embodiments, the base plate 10 has guide ribs 221-226 for decreasing frictional resistance brought about between the iris diaphragm 1b and the base plate 10. The iris diaphragm 1a is provided at the acute notch 5a formed in one part of the exposure space 2a with a filter member 9 for regulating intensity of light passing through the iris aperture when the aperture is decreased in size to the minimum.

Though the driving motor for operating the rocking lever is attached to the lower side of the base plate in the foregoing embodiment, it may however be mounted on the upper side of the same by use of adequate supporting means.

As is plain from the foregoing description, the exposure control device according to the present invention enables the iris diaphragms incorporated therein to move smoothly and reliably without wobbling in fast response to changes of brightness of a subject to be taken as an image, because each of the iris diaphragms is connected at one point to the rocking lever for operating the iris diaphragms and guided slidably by one guide pin planted on the base plate, and the base plate and the guard cover have a plurality of guide ribs for permitting the iris diaphragms to come into line contact with the base plate and the guard cover so as to effectively reduce the frictional resistance produced therebetween. By providing the iris diaphragms with the anti-interference means, the iris diaphragms in motion do not collide with each other, thereby to enable reliable and stable opening and closing of the iris aperture to be fulfilled without causing the iris diaphragms to interfere with each other. Moreover, the exposure control device of this invention has an advantage that it is simple in structure and easy to assemble.

Although the invention has been described in its preferred form with a certain degree of particularity, it is understood that present disclosure of the preferred form has been changed in the details of construction and the combination and arrangement of parts may be resorted to without departing from the spirit and the scope of the invention as hereinafter claimed.

What is claimed is:

1. An exposure control device in a camera, which comprises an iris composed of a pair of iris diaphragms each having an exposure space, which define an iris aperture and each have a guide slot and a pin hole; a driving motor which is driven in accordance with brightness of a subject to be taken as an image; a rocking lever mounted on said driving motor and provided on its both end portions with driving pins which are in engagement with said pin holes formed in said iris diaphragms; and a base plate having an exposure opening about an optical axis and guide pins slidably fitted one into each guide slot of the iris diaphragms so as to permit the iris diaphragms to move in substantially opposite directions with said rocking lever being, operated by said driving motor, said base plate being provided on its upper surface with guide ribs which come into contact with at least one of said iris diaphragms.

2. An exposure control device according to claim 1, further comprising a guard cover for covering said diaphragms in conjunction with said base plate, which is fixed onto said base plate and provided on its lower surface with longitudinal guide ribs coming into contact with at least one of said iris diaphragms.

3. An exposure control device according to claim 2, wherein said guide ribs formed on the base plate are opposite to the longitudinal guide ribs on said guard cover.

4. An exposure control device according to claim 2, wherein said guide ribs formed on the base plate are displaced relative to the longitudinal guide ribs on said guard cover.

5. An exposure control device according to claim 1, wherein one of said iris diaphragms is provided on a part of a circumferential edge portion of the exposure space thereof with an anti-interference expansion, and the other diaphragm is provided in a part of a circumferential edge portion of the exposure space thereof with a counterpart anti-interference dent.

6. An exposure control device according to claim 1, wherein said base plate has a surrounding wall formed intermittently and positioning projections formed on said surrounding wall.

7. An exposure control device according to claim 1, wherein said base plate has arcuate holes for allowing said driving pins of said rocking lever to pierce therethrough and at least one arcuate rib formed along said arcuate hole so as to slidably support one of said iris diaphragms.

8. An exposure control device according to claim 7, wherein said guard cover has arcuate holes for allowing said driving pins of said rocking lever to pierce therethrough and at least one arcuate rib formed along said arcuate hole so as to slidably support one of said iris diaphragms.

9. An exposure control device according to claim 2, wherein at least one of said guide ribs which is in contact with one of said iris diaphragms is different in height from the remaining guide ribs.

10. An exposure control device according to claim 7, wherein at least one of said guide ribs which is in contact with one of said iris diaphragms is different in height from the remaining guide ribs.

11. An exposure control device according to claim 2, wherein at least one transverse guide rib is formed on at least one of the base plate and guard cover at positions where the guide slots of said iris diaphragms pass, which guide rib has a length larger than the width of said guide slots of said iris diaphragms.

12. An exposure control device according to claim 11, wherein said guard cover has an exposure opening which is aligned with the exposure opening of said base plate, said transverse guide rib formed on at least one of said base plate and guard cover being connected to said exposure opening of at least one of said base plate and guard cover.

13. An exposure control device in a camera, which comprises an iris composed of a pair of iris diaphragms each having an exposure space, which define an iris aperture and each have a guide slot and a pin hole; a driving motor which is driven in accordance with brightness of a subject to be taken as an image; a rocking lever provided on its both end portions with driving pins which are in engagement with said pin holes formed in said iris diaphragms; a link having one end connected to said driving motor and a free end connected to said rocking lever to transmit rotational motion of said motor to said rocking lever; a base plate having an exposure opening about an optical axis and guide pins slidably fitted one into each guide slot of the iris diaphragms so as to permit the iris diaphragms to move in substantially opposite directions with said rocking lever being operated by said driving motor; and a guard cover for covering said diaphragms in conjunction with said base plate, which is fixed onto said base plate, said base plate being provided on its upper surface with guide ribs which come into contact with at least one of said iris diaphragms, and said guard cover being provided on its lower surface with longitudinal guide ribs coming into contact with at least one of said iris diaphragms.

14. An exposure control device according to claim 13, wherein said guide ribs formed on the base plate are opposite to the longitudinal guide ribs on said guard cover.

15. An exposure control device according to claim 13, wherein said guide ribs formed on the base plate are displaced relative to the longitudinal on said guard cover.

* * * * *